United States Patent [19]

Rosswurm

[11] Patent Number: 5,012,237
[45] Date of Patent: Apr. 30, 1991

[54] REFLECTED ELECTROSTATIC FIELD ANGLE RESOLVER

[75] Inventor: Mark A. Rosswurm, Columbus, Ind.

[73] Assignee: Cummins Electronics Company, Inc., Columbus, Ind.

[21] Appl. No.: 358,651

[22] Filed: May 26, 1989

[51] Int. Cl.$^5$ ............................................. G08C 19/10
[52] U.S. Cl. ............................. 340/870.37; 324/660
[58] Field of Search ............. 340/870.37, 686, 870.25; 324/61 R, 61 P; 73/862.34; 341/116, 117; 318/661

[56] References Cited

U.S. PATENT DOCUMENTS

| | | | |
|---|---|---|---|
| 3,938,113 | 2/1976 | Dobson et al. | 340/870.37 |
| 3,961,318 | 6/1976 | Farrand | 340/870.37 |
| 4,040,041 | 8/1977 | Fletcher et al. | 340/870.37 |
| 4,092,579 | 5/1978 | Weit | 318/622 |
| 4,238,781 | 12/1980 | Vercellotti et al. | 340/870.37 |
| 4,418,348 | 11/1983 | Tanaka et al. | 340/870.37 |
| 4,435,702 | 3/1984 | Imai | 340/671 |
| 4,543,526 | 9/1985 | Burckhardt et al. | 324/61 R |
| 4,862,752 | 9/1989 | Hoyt | 340/870.37 |

FOREIGN PATENT DOCUMENTS

A1270440 6/0888 European Pat. Off. .
A2226716 7/1987 European Pat. Off. .
OS3711062 10/1988 Fed. Rep. of Germany .

OTHER PUBLICATIONS

"Capacitive Rotary Motion Digitizer", P. A. Quinn, Jr. and D. L. West, p. 6538, *IBM Technical Disclosure Bulletin*, vol. 24, No. 12, May 1982.

Primary Examiner—Palmer C. DeMeo
Assistant Examiner—Yuk H. Lau
Attorney, Agent, or Firm—Woodard, Emhardt, Naughton, Moriarty & McNett

[57] ABSTRACT

An improved electrostatic angle resolver is disclosed which eliminates capacitive coupling surfaces from rotor and stator device components of the invention, thus reducing over all space necessary for the resolver. Additionally, the concept disclosed also eliminates the need for rotor guarding techniques to prevent signal loss due to stray and parasitic capacitances. Essentially, current required to maintain capacitor plates at a particular voltage is monitored, and the variations in the current are transformed into voltages, and supplied to an amplifier which, in turn, provides isolation between the sensor, and associated angular decoding circuitry.

17 Claims, 2 Drawing Sheets

ROTOR
PRIOR ART

STATOR
PRIOR ART

ROTOR

STATOR

REFLECTED ELECTROSTATIC FIELD ANGLE RESOLVER

BACKGROUND OF THE INVENTION

This invention relates to electrostatic position sensors and more particularly to brushless angle resolvers incorporating reflected electrostatic field detection concepts.

A number of prior art angle resolvers utilize electrostatic technology to produce an output signal indicative of angular position. A variety of sensors have been developed which include AC as well as DC excitation. The electrostatic angle resolver is essentially comprised of two variably shaped metallic plates the first being stationary and the second rotated in opposition to the first to vary the plate surface area exposed between the two plates thereby creating a variable capacitor. An electrostatic charge source is connected to the stationary plate and the electrostatic charge acquired by the moving plate from the stationary plate is reflected back to the stationary plate by way of a coupling capacitor. After reflection to the stationary plate, the signal is electronically analyzed and the position of the rotating plate with respect to the stationary plate is ascertained. Examples of such devices are shown in U.S. Pat. No. 4,092,579 to Weit, U.S. Pat. No. 4,040,041 to Fletcher et al., U.S. Pat. No. 4,435,702 to Imai, U.S. Pat. No. 3,961,318 to Farrand, U.S. Pat. No. 4,418,348 to Tanaka et al., and U.S. Pat. No. 4,238,781 to Vercellotti et al.

Typically, the output signal of an angle resolver of the prior art is coupled from the rotor to the stator by means of a coupling capacitor. The coupling capacitor is formed by parallel plates that are aligned and registered on the stator and rotor elements of the device usually taking the form of opposing disk shaped electrodes. An inherent problem with sensors of the prior art is the loss of signal strength due to stray capacitances affecting the rotor and stator coupling capacitor electrode plates. When an electrostatic angle resolver application calls for installation in close proximity to nearby metallic objects, the problems attributable to stray capacitances become more significant. Additionally, where size or space constraints placed upon the angle resolver due to a particular application limit the available space for the device, additional problems may arise.

An angle resolver design which eliminates the rotor to stator coupling capacitor would result in a space claim savings of up to 50% of the original volume of the resolver in most applications.

SUMMARY OF THE INVENTION

An improved electrostatic angle resolver according to a typical embodiment of the present invention includes at least one charge source means, stator means connected to the charge source means, the stator means producing a patterned electrostatic field, rotor means within the electrostatic field of the stator means, the rotor means connected to a rotor voltage reference, and circuit means for measuring current flow from the charge source means to the stator means and producing a dQ/dt signal indicative of rotor position within the patterned electrostatic field emanating from the stator.

One object of this invention is to provide an improved electrostatic angle resolver.

Another object of the present invention is to provide an angle resolver which eliminates the need for a coupling capacitor to couple the rotor signal back to the stator.

Another object of the invention is to provide an angle resolver of significantly reduced size in comparison to available alternative devices.

Another object of the invention is to provide an angle resolver which is unaffected by metallic objects in near proximity to the resolver.

Related objects and advantages of the present invention will be apparent from the following description.

DESCRIPTION OF THE PREFERRED EMBODIMENT

Figure 1:
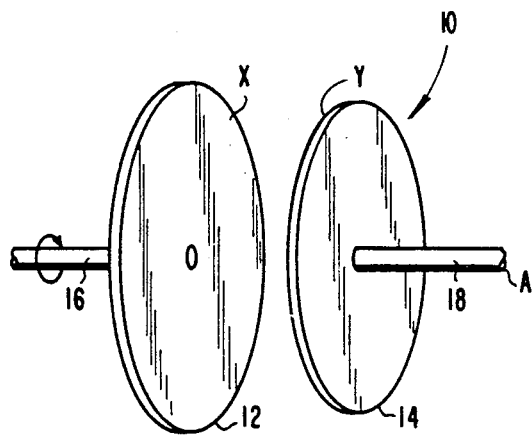
FIG. 1 is a diagrammatic illustration of a typical electrostatic angle resolver.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a diagrammatic illustration of an angle resolver 10 is shown, conceptually illustrating the position of the rotor 12 with respect to the stator 14. Surface X of rotor 12 and surface Y of stator 14 include conductive electrodes which electrostatically interact to form capacitors. Rotor 12 is rigidly attached to a rotating shaft 16. Stator 14 is held in fixed position by shaft 18, and shaft 18 is anchored at end A. In a typical embodiment of an electrostatic angle resolver of the prior art wherein the stator and rotor are constructed using copper clad fiberglass circuit boards, surfaces X and Y are located in relatively close proximity to one another, with approximately 0.020 to 0.050 inches of air therebetween.

Figure 2A:
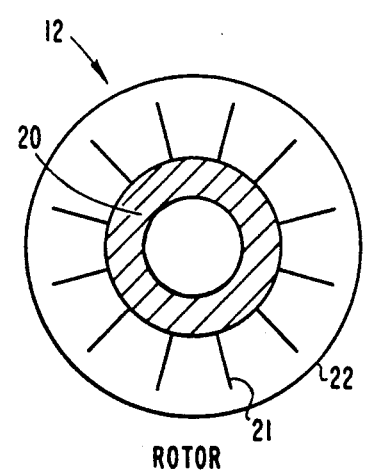
FIG. 2A is a front elevational view of the rotor surface X of FIG. 1 illustrating the configuration of the electrodes of a rotor of the prior art.
Figure 2B:
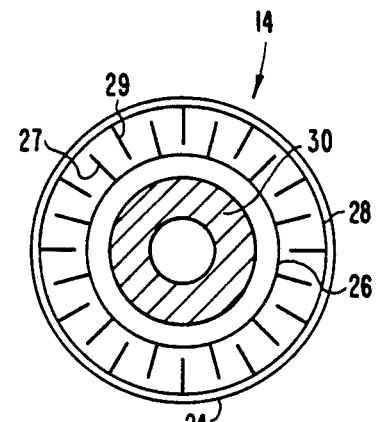
FIG. 2B is a front elevational view of the stator surface Y of FIG. 1 showing the metallic electrodes of a stator of the prior art.

Referring now to FIGS. 2A and 2B, a front elevation of a rotor 12 and a stator 14 of an angle resolver of the prior art are respectively shown. Rotor 12 of FIG. 2A is constructed on conductive foil clad circuit board 22 having etched patterns in the surface of the conductive foil. A rotor coupling capacitor surface 20 and rotor vanes 21 are created by etching away the conductive foil to create the patterns of metal shown. Similarly, in FIG. 2B, a stator of the prior art is shown having negative ring electrode 26 connected to negative interdigitations 27, a positive ring electrode 28 connected to positive interdigitations 29, and a coupling capacitor surface 30 are all etched into the conductive foil of circuit board 24 for the stator 14. Detailed information regarding the operation of a device of the prior art may be found in U.S. application Ser. No. 343,031, entitled IMPROVED ELECTROSTATIC POSITION SENSING ANGLE RESOLVER, filed Apr. 25, 1989, by M. Rosswurm et al., a pending application, the disclosure of which is hereby incorporated by reference.

Figure 3A:
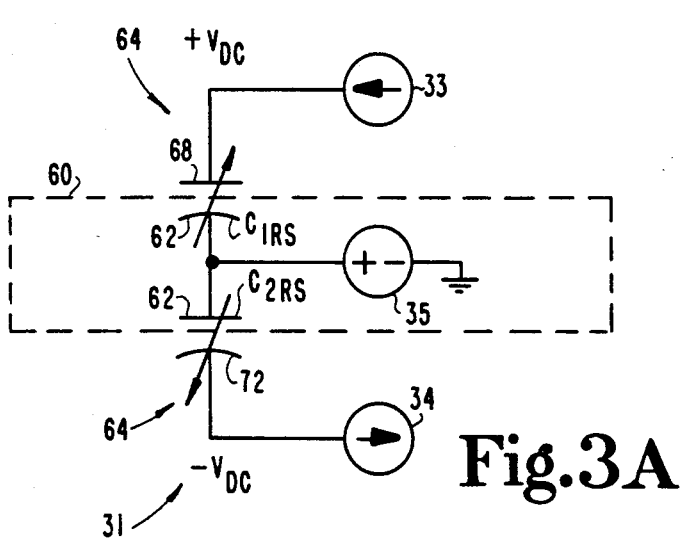
FIG. 3A is a schematic diagram of a typical embodiment of the present invention.

Referring now to FIG. 3A, a schematic diagram of an electrostatic angle resolver 31 according to the present invention is shown. A rotor 60 is shown having rotor vanes 62 which interact with positive interdigitations 68 and negative interdigitations 74 of stator 64. The interaction of the rotor vanes 62 and the interdigitations 68 and 72 create two variable capacitors $C_{1RS}$ and $C_{2RS}$. The stator plates, interdigitations 68 and 72, are maintained at a fixed DC voltage, with $+V_{DC}$ supplied to plate 68 and $-V_{DC}$ supplied to plate 72. In practice, charge sources 33 and 34 would typically be fixed voltage sources. The vanes 62 of rotor 60 are maintained at a particular constant electrostatic potential by voltage source 35. However, voltage source 35 can be eliminated and the vanes 62 of rotor 60 may be tied directly to ground, or capacitively coupled to ground thereby providing an AC signal ground.

The stator 64 and rotor 60 are similar in construction to the previously described application incorporated by reference above. Note, however, that the rotor to stator coupling capacitor of the prior art is entirely eliminated in the angle resolver 31 shown in FIG. 3A. As the rotor rotates in the electrostatic (E) field generated by the positive and negative potential on interdigitations 68 and 72, charge is lost and gained from the stator interdigitations. The charge fluctuations causes a dQ/Dt current signal proportional to the rate of change of the E field reflected to the stator 64 to flow to electrodes 68 and 72. The change in the stator E field is influenced directly by the angular position of the rotor vanes, which are at a constant voltage passing through the stator E field. The stator E field (referenced to zero potential at infinity) changes when the rotor electrodes or vanes 62 are moved in proximity to the stator electrodes or interdigitations 68 and 72. The moving rotor reflects a changing value for the electrostatic field because of the change in near field potential. Charge flow or current flow takes place to maintain the electrodes 68 and 72 at predetermined voltages $+V_{DC}$ and $-V_{DC}$. This current flow is measured and used to determine angular position.

The change in reflected E field can also be thought of as a change in stator to rotor capacitance. The "capacitance" between the rotor and stator changes as the rotor rotates with respect to the stator. The dC/dt (rate of change of stator to rotor capacitance with respect to time) causes a dQ/dt (or current) to flow to and from the stator plates 68 and 72. This current can be sensed by electronic circuitry sensitive to the current flow.

Note that any rotor signal loss due to stray capacitances is eliminated in this embodiment of the invention since the rotor potential remains fixed with respect to system ground. Also note that all output sensing is accomplished by means of monitoring the flow of current to the stator so that a separate means of transferring rotor information to a non-rotating pick up located on or near the stator is no longer required. With the need for a coupling capacitor eliminated, the resolver volume can be reduced by as much as 50%. Since no signal information is transferred from the rotor to the stator, no techniques need be implemented to transfer power to the rotor for rotor shielding or guarding, and no electronics are necessary for rotor guarding techniques.

Figure 3B:
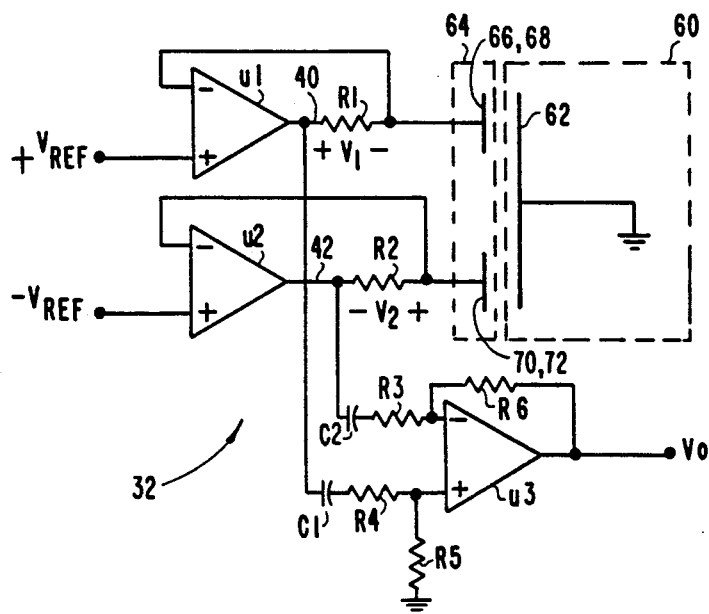
FIG. 3B is a schematic diagram of a typical embodiment of the present invention showing detailed circuit construction.

Referring now to FIG. 3B, a schematic diagram of an improved angle resolver 31, according to the present invention is shown. Voltage reference $+V_{REF}$ is supplied to the positive input of amplifier U1. The output of amplifier U1 is connected to resistor R1 by way of signal path 40, hereinafter referred to as signal 40. The output of U1 is also capacitively coupled to resistor R4 by way of capacitor C1. The other lead of resistor R4 is connected to R5 and to the positive input of amplifier U3. Resistor R5 provides a bias path to ground for bias currents from the positive input of U3 and, in conjunction with R3, R4 and R6, determines the gain of differential amplifier U3. Resistor R1 is connected at its remaining lead back to the negative input of amplifier U1 and is also connected to positive stator ring electrode 66 and interdigitations 68. Minus $V_{REF}$ is supplied to the positive input of amplifier U2. The output of amplifier U2 is connected, by way of signal path 42 or signal 42, to resistor R2. The remaining lead of resistor R2 is connected to negative stator interdigitations 72 via ring electrode 70 and the negative input of amplifier U2. Signal path 42, or signal 42, is capacitively coupled by way of capacitor C2 to resistor R3. The remaining lead of resistor R3 is connected to amplifier U3 at the negative input and also connected to feedback resistor R6. The output of U3 is connected to the remaining lead of R6 and also sources the output voltage of the circuit, $V_O$. Rotor 60 is shown with rotor vanes 62 opposing interdigitations 68 and 72. Rotor vanes 62 are connected to ground. The rotational movement of rotor 60 causes the capacitors formed by interdigitations 68 and 72 with rotor vanes 62 to vary in capacitance, thereby having an electrostatic effect on the interdigitations 68 and 72. In order to maintain the interdigitations 68 and 72 at a fixed voltage, current flow is supplied by amplifiers U1 and U2 through resistors R1 and R2, respectively, to the stator 64 and more particularly to electrodes 66 and 70. The current flowing through resistors R1 and R2 creates voltage drops $V_1$ and $V_2$, respectively, which voltages are supplied to the difference amplifier U3. Typical values for R1 and R2 are 500 K ohms. Capacitors C1 and C2 are typically 0.1 microfarads, and resistors R3, R4, R5 and R6 are typically 100 K ohms. An operational amplifier designated LM1558, manufactured by National Semiconductor may be used for amplifiers U1, U2, and U3. National Semiconductor has offices located at 2900 Semiconductor Drive, Santa Clara, Calif. 95051.

Amplifiers U1 and U2 are connected in a closed loop feedback mode with the stator plus and minus interdigitation voltages respectively fed back and compared to the $+V_{REF}$ and $-V_{REF}$ voltages. As current flows to the stator positive plate from U1, voltage $V_1$ changes to the extent required to keep the stator positive plate 68 at the reference potential. U1 sources or sinks current for the positive stator interdigitation 68. Resistor R1 translates a charge source or sink current to an easily processed change in voltage, $V_1$. The positive output voltage signal appearing at signal 40 is calculated as: $V_{40}=R_1(dQ_1/dt)+V_{REF}$, where Q1 is the charge on the stator positive interdigitations 68.

Similarly, the amplifier U2 sources or sinks the charge required to keep the stator negative interdigitations 72 at the minus reference voltage $-V_{REF}$. As long as the rate-of-change of charge is within the voltage and frequency limitations of the amplifier U1 or U2, the stator interdigitations 68 and 72 will remain at a constant reference DC voltage. Thus the gain bandwidth of the operational amplifier selected for this device should be chosen in view of the voltage and frequency requirements of the angle resolver.

Changes or deviation in angular position of the rotor 60 with respect to the stator 64 are sensed by measuring the difference between the voltage at signal 40 and signal 42. U3 serves as a differential output amplifier with gain determined by the $R_6$ over $R_3$ ratio, and $R_6$ over $R_4$ ratio. If R3 and R4 are equal in value, and R5 and R6 are equal in value, then the final output voltage $V_0$ is given by:

$$V_0 = \frac{R_6}{R_3}(V_{40}-V_{42})$$

Circuitry well known in the art is connected to output signal $V_0$ in a typical application wherein angular displacement of a rotating member must be measured. Such circuitry typically transforms the pseudo-sinusoidal signal produced at $V_0$ into a square wave. Subsequently the square wave is supplied to the input of a logic circuit whereby angular rotation is determined by counting the transitions of the square wave signal from low to high, with each transition corresponding to a fixed angular displacement of the rotor with respect to the stator.

Two important features of this embodiment should be apparent to those skilled in the art. First, since the stator interdigitations are maintained at a constant DC voltage, charge loss/gain from the stator due to changes in the stator voltage is eliminated. The disclosed embodiment insures accurate measurement of charge flow as a result of rotor angular position changes unaffected by the influences of stray capacitances. Secondly, the size of the stator and rotor are reduced by the elimination of the coupling capacitor necessary in devices of the prior art. The reduced size requirements will result in an overall space savings for the angle resolver device.

It should also be apparent to one skilled in the art that although this embodiment details a bi-polar implementation, which requires three amplifiers, the concept can be implemented with a unipolar set of stator interdigitations which would required only one amplifier. The disadvantages of this simplification would be a six dB reduction in output signal and a resultant decrease in signal to noise ratio or S/N ratio.

Figure 4:
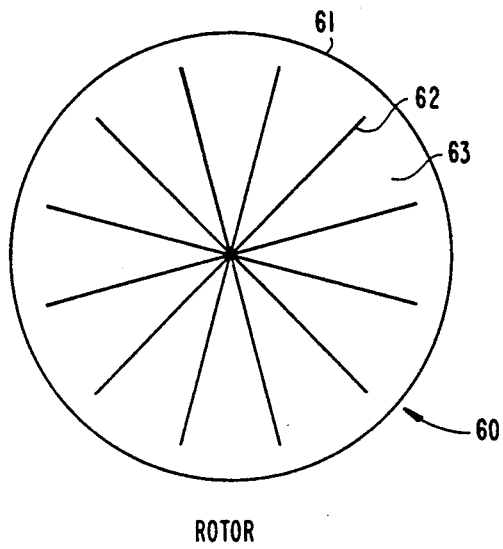
FIG. 4 is a front elevational view of the rotor surface X of FIG. 1 showing the arrangement of metallic plate elements of the rotor of the embodiment shown in FIG. 3A.

Referring now to FIG. 4, a front elevational view of the rotor 60 is shown. As an example of a typical construction technique, rotor vanes 62 are etched into the conductive foil of circuit board 61. As compared to the prior art rotor 12 of FIG. 2A, rotor 60 clearly shows a space savings in that the length of each vane 62 is increased due to the fact that the rotor coupling surface 20 of FIG. 2A is no longer required for the angle resolver according to the invention. Thus, for electrodes of equal length the diameter of circuit board 61 need not be as great as the diameter of the circuit board required to construct the rotor shown in FIG. 2A. The area designated 63 is bare exposed fiberglass of the circuit board 61.

Figure 5:
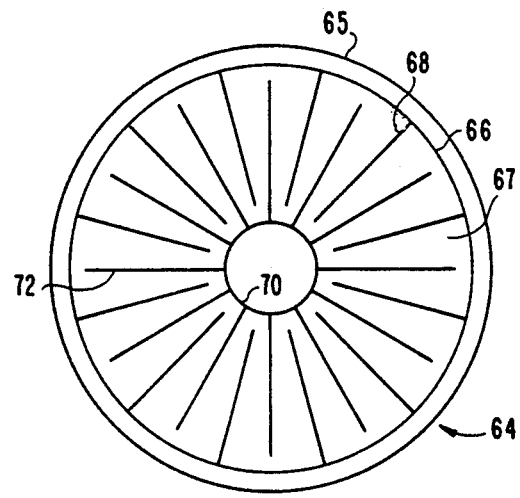
FIG. 5 is a front elevational view of the stator surface Y of FIG. 1 showing the arrangement of metallic plate elements of the stator of the embodiment shown in FIGS. 3A and 3B.

Referring now to FIG. 5, a stator 64 is shown as configured for use with the angle resolver according to the invention shown in FIG. 3A. The same space savings realized with the rotor 60 and described above is also recognized in reference to the stator of the prior art of FIG. 2B as compared with the stator 64 according to the invention.

As an example of a typical construction technique, stator 64 is fabricated on circuit board 65 by using acid etching processes well known in the circuit board fabrication art to create ring electrode 66 and positive interdigitations 68 connected to ring electrode 66 which comprise one plate of capacitor $C_{1RS}$ of FIG. 3A. Similarly, ring electrode 70 is connected with negative interdigitations 72 which make up one plate of capacitor $C_{2RS}$ of FIG. 3A with the vanes 62 of rotor 60 in FIG. 4. The interdigitations or protrusions from the ring electrodes 66 and 70, are arranged to substantially bisect the angles defined by the opposing interdigitations. Thus, ring elements 66, 68, 70 and 72 combine to form concentric electrodes having interdigitated portions useful in creating a patterned electrostatic field by applying different potentials to each ring electrode. It should also be noted that the number of vanes 62 of rotor 60 in FIG. 4 correspond identically in number and angular spacing to the numbers of interdigitations 68 or the quantity of interdigitations 72. The surface area 67 exposed on circuit board 65 is bare circuit board exposed during the etching process, and provides an insulator between the electrodes 70 and 66 of the stator 64.

An alternate fabrication technique for stator 64 of FIG. 5 and rotor 60 of FIG. 4 involves silk-screening metallic particle paste on top of porcelain-on-steel substrate material used as the rotor and stator base material. This technique is used to form the electrodes 62 in FIG. 4 and the electrodes 72, 68, 70 and 66 of FIG. 5. Various metallic particles may be used in the metallic liquid paste, such as copper, silver or gold particles. The paste is silk-screened onto the porcelain-on-steel rotor or stator substrate surface in the shape of the desired electrodes. The substrate is then sintered or fired in order to reflow the metal and bond the metal particles to the surface of the porcelain-on-steel substrate thereby creating electrodes.

Figure 6:
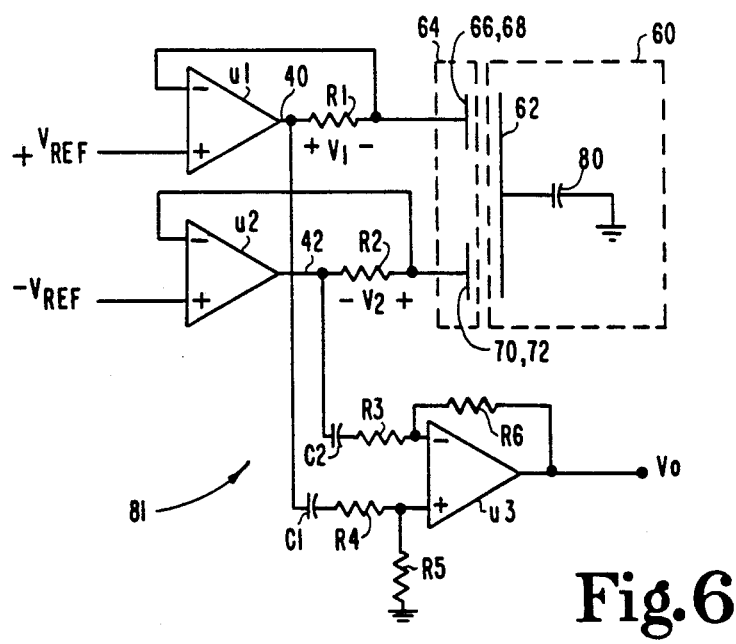
FIG. 6 is a schematic diagram of another embodiment of the present invention showing a stator, a rotor capacitively coupled to ground, and accompanying circuitry.

Referring now to FIG. 6, a schematic diagram of an improved angle resolver 81 according to the present invention is shown. Voltage input signals $+V_{REF}$ and $-V_{REF}$ are supplied to the positive inputs of amplifiers U1 and U2, respectively. The output of amplifier U1 supplies a signal 40 to resistor R1 and capacitor C1. The output of amplifier U2 supplies a signal to resistor R2 and to capacitor C2 by way of signal path 42. The remaining lead of resistor R1 is connected to the negative input of amplifier U1 and to the negative electrode 66 and interdigitations 68 of stator 64. The remaining lead of resistor R2 is connected to electrode 70 and interdigitations 72 and to the negative input of amplifier U2. Capacitor C2 is connected to resistor R3. The remaining lead of resistor R3 is connected to the negative input of amplifier U3 and resistor R6. Resistor R6 is connected then to the output of amplifier U3, where the output signal $V_0$ is supplied by amplifier U3. Capacitor C1 is connected to resistor R4, which in turn is connected to the positive input of amplifier U3 and to resistor R5, which supplies a bias path to ground the positive input of amplifier U3. The deference between the angle resolver shown in FIG. 3B and the angle resolver 81 shown in FIG. 6, is the capacitor 80 which provides a capacitive coupling to ground for the rotor vanes 62 of the rotor 60. Essentially, nearby grounded metallic objects in the vicinity of rotor 60 will provide and make up the stray capacitances which will adequately substitute for capacitor 80. Thus, it would not be a necessity to make an electrical connection to rotor vanes 62 as the stray capacitance coupling rotor 60 to ground provide an AC ground reference for the rotor vanes 62.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electrostatic angle resolver comprising:
   (a) a DC charge source means;
   (b) stator means for producing a patterned electrostatic field, said stator means connected directly to said DC charge source means;
   (c) rotor means within the field of said stator means, said rotor means connected to a potential reference; and
   (d) circuit means for measuring current flow from said DC charge source means to said stator means and producing a dQ/dt signal indicative of rotor movement within the patterned electrostatic field emanating from said stator.

2. The electrostatic angle resolver of claim 1 including a first and a second DC charge source means, and wherein said stator means includes first and second concentric interdigitated electrodes, said first DC charge source means connected to said first electrode and said second DC charge source means connected to said second electrode.

3. The electrostatic angle resolver of claim 2 wherein said first and second DC charge source means both include operational amplifier circuits.

4. The electrostatic angle resolver of claim 3 wherein said operational amplifiers circuits are arranged in a voltage follower configuration.

5. The electrostatic angle resolver of claim 4 wherein the output of each voltage follower operational amplifier circuit is supplied to a first lead of a resistor, said resistor also having a second lead connected to a feedback loop as well as one of said electrodes, said dQ/dt signal derived proportionally from the voltage appearing across each of said resistors.

6. The electrostatic angle resolver of claim 1 wherein said stator means and said rotor means are constructed on metal clad printed circuit board material.

7. The electrostatic angle resolver of claim 2 wherein said first interdigitated concentric electrode includes a first ring electrode axially aligned with the axis of rotation of said rotor, said first ring electrode including electrodes of a predetermined length extending radially outward from said first ring electrode at predetermined fixed angular increments, said second interdigitated concentric electrode including a second ring electrode concentric with and larger in radius than the radius of said electrodes extending from said first ring electrode, said second ring electrode having electrodes extending radially inward from said second ring electrode into the spaces defined by the metallic electrodes of said first ring electrode.

8. An electrostatic angle resolver for measuring angular displacement of a rotating member and comprising:
   (a) first circuit means for providing a first fixed DC voltage output signal;
   (b) stator means connected directly to said first fixed DC voltage output signal for producing a patterned electrostatic field;
   (c) rotor means situated within said patterned electrostatic field; and
   (d) current measuring means for monitoring current flowing from said first circuit means to said stator means in response to rotation of said rotor.

9. The electrostatic angle resolver of claim 8 including a second circuit means for providing a second fixed DC voltage output signal to said stator means, and wherein said current measuring means monitors current flow from said first and second circuit means to said stator means.

10. The electrostatic angle resolver of claim 9 wherein said stator means includes first and second electrode means connected to said first and second fixed voltage output signals respectively.

11. The electrostatic angle resolver of claim 10 wherein said first and second fixed voltage output signals are of opposite polarity.

12. The electrostatic angle resolver of claim 10 wherein said first and second electrode means are concentric ring electrodes.

13. The electrostatic angle resolver of claim 12 wherein said concentric ring electrode each have radial protrusions located at predetermined angular intervals extending radially toward the opposing concentric ring electrode.

14. The electrostatic angle resolver of claim 13 wherein said radial protrusions are situated so that said protrusions projecting radially inward from the outer concentric ring electrode substantially bisect the angles defined by said electrode protrusions extending radially outward from said inner concentric ring electrode.

15. The electrostatic angle resolver of claim 14 wherein said rotor means includes interconnected rotor electrodes extending in a radial direction from the axis of rotation of said rotor, said rotor electrodes arranged to rotate in a plane perpendicular to the axis of rotation of said rotor.

16. The electrostatic angle resolver of claim 15 wherein said rotor electrodes are angularly arranged so as to oppose the electrode protrusions of said outer concentric ring electrode and subsequently oppose the electrode protrusions of said inner concentric ring electrode when said rotor rotates in response to the rotation of said rotating member.

17. The electrostatic angle resolver of claim 1 wherein said stator means and said rotor means are constructed on a porcelain-on-steel substrate with electrodes formed and situated on top of said substrate.

* * * * *

UNITED STATES PATENT AND TRADEMARK OFFICE
CERTIFICATE OF CORRECTION

PATENT NO. : 5,012,237

DATED : April 30, 1991

INVENTOR(S) : Mark A. Rosswurm

It is certified that error appears in the above-identified patent and that said Letters Patent is hereby corrected as shown below:

In column 3, line 22, the numeral "74" should be changed to the numeral --72--.

In column 5, line 54, the word "required" should be changed to the word --require--.

In column 5, line 55 the word "disadvantages" should be changed to the word --disadvantage--.

In column 8, line 37 the word "electrode" should be changed to the word --electrodes--.

In column 8, line 39 before "extending" insert the word --and--.

Signed and Sealed this

Eleventh Day of August, 1992

Attest:

DOUGLAS B. COMER

*Attesting Officer*   *Acting Commissioner of Patents and Trademarks*